United States Patent Office 3,059,694
Patented Oct. 23, 1962

3,059,694
METHOD OF SPRAY DRYING POTASSIUM BICARBONATE
Jacob W. Sietsema, Northbrook, Ill., assignor to International Minerals & Chemical Corporation, a corporation of New York
No Drawing. Filed Apr. 7, 1959, Ser. No. 804,594
3 Claims. (Cl. 159—48)

The present invention generally is directed to the art of spray drying. More particularly, it is related to the spray drying of potassium bicarbonate. Still more particularly, it relates to a method for spray drying potassium bicarbonate utilizing gas-atomizing techniques.

Spray drying, or granulation by spray drying, is a method of drying which is widely utilized on a commercial scale in various industries. Spray drying is, for example, used to prepare the new instant coffees and the modern household detergents. Various chemical powders are also produced in dry form in spray drying operations.

In spray drying operations, a liquid, which may be a solution or slurry, is sprayed into a heated gas. The drops of liquid present a large surface of contact between the drops and the gas, making possible a very high rate of vaporization. The sprayer is usually located at either the top or bottom of a large vertical cylindrical drying chamber which usually has a height at least equal to the diameter. The drying gases normally pass through the drying chamber cocurrent with the particles; however, countercurrent flow may be used.

Potassium bicarbonate, $KHCO_3$, may be prepared by crystallization from aqueous solution. The potassium bicarbonate crystals may be filtered or centrifuged from the mother liquor and dried in an oven or other suitable drying equipment. Care must be exercised when drying potassium bicarbonate because at elevated temperatures the potassium bicarbonate decomposes to form potassium carbonate. Because of the relatively high temperatures required in spray drying operations, it was not previously believed to be practical to prepare solid potassium bicarbonate from aqueous potassium bicarbonate solutions by spray drying. It has, however, now been discovered that dry potassium bicarbonate may be prepared in a spray drying operation when following the method of the present invention.

It is, accordingly, an object of the present invention to provide a method for spray drying potassium bicarbonate.

It is another object of the present invention to provide a method for spray drying potassium bicarbonate which is readily adaptable for use on a commercial scale using commercially available equipment.

These and other objects and advantages of the present invention will be apparent to those skilled in the art as the description of the invention progresses.

In general, the present invention is a method for spray drying potassium bicarbonate which comprises spraying an aqueous solution of potassium bicarbonate into a substantially dry, gaseous atmosphere containing carbon dioxide. In a preferred embodiment of the present invention, the potassium bicarbonate solution is sprayed into the drying chamber through a gas-atomizing nozzle wherein the aqueous potassium bicarbonate solution is broken up into small drops by impingement with a high-velocity stream of gas containing carbon dioxide. In another embodiment, carbon dioxide gas is dissolved in the aqueous bicarbonate solution and then sprayed into the drying chamber.

As hereinbefore set forth, spray drying methods, or granulation by spray drying methods, are well known to those skilled in the art and are extensively employed commercially. The apparatus used in the present spray drying process may be of any suitable type, such as is commercially available. The specific apparatus employed does not form a critical feature of this invention except as will hereinafter become apparent. In a preferred embodiment, a gas-atomizing nozzle is used. Gas-atomizing nozzles are also commercially available.

In accordance with the present invention, an aqueous solution of potassium bicarbonate is sprayed into a drying zone wherein the water evaporates from the drops of the aqueous solution, thereby forming substantially dry potassium bicarbonate. In order to decrease the amount of evaporation required in the drying chamber, the aqueous solution may be concentrated; however, dilute solutions may also be used. In general, it is preferred to use at least a 5% aqueous solution of potassium bicarbonate. The solution may be at any suitable temperature.

Any suitable type of spray nozzle may be used; however, a gas-atomizing nozzle is preferred. The aqueous solution is sprayed into a gaseous atmosphere in which the relative humidity is relatively low so that the water in the drops may readily evaporate. In general, the relative humidity in the gaseous atmosphere is below 50% and preferably below about 25%.

If an aqueous solution of potassium bicarbonate were sprayed into hot air having a low relative humidity, drying would be effected; however, it has been determined that when using substantially pure air at an elevated temperature the potassium bicarbonate decomposes to form potassium carbonate which contaminates the potassium bicarbonate product.

In accordance with the present invention, it has been discovered that the amount of potassium carbonate formed during spray drying is substantially reduced when carbon dioxide is present in the drying gases. In general, it has been determined that the drying gas should contain at least 2% carbon dioxide by volume in order to achieve a substantial reduction in the amount of potassium carbonate in the product. The carbon dioxide may be mixed with air or other suitable drying gas, for example, nitrogen, hydrogen, etc., and passed at an elevated temperature cocurrent or countercurrent to the droplets of bicarbonate solution, depending upon whether equipment of the cocurrent or countercurrent type is employed.

In another embodiment, the carbon dioxide may be dissolved in the potassium bicarbonate solution and then sprayed into the drying chamber. The amount of carbon dioxide which may be dissolved depends upon temperature of the solution, pressure, concentration of the bicarbonate, etc. In order to increase the amount of dissolved carbon dioxide, the carbon dioxide may be put into the solution under pressure.

It has been found that unexpected and highly beneficial results are obtained when the aqueous solution is sprayed into the drying chamber through a gas-atomizing nozzle wherein the liquid is broken up into drops by impingement with a high-velocity stream of gas containing carbon dioxide. All of the carbon dioxide present in the drying gases in the drying chamber may be introduced as dissolved $CO_2$ in the potassium bicarbonate solution or introduced through the gas-atomizing nozzle or, when desired, only a portion of the carbon dioxide in the gases may be introduced in the solution or through the spray drying nozzle with further carbon dioxide introduced with the entering drying gases. Regardless of the method of introducing the carbon dioxide, the gaseous atmosphere in the drying chamber preferably contains at least about 2% by volume of carbon dioxide.

The specific method of introducing the aqueous potassium bicarbonate into the gas-atomizing nozzle is not particularly important and the solution may be fed under pressure, low gravity head, sucked up by the injection of the gaseous stream, etc., depending, of course, upon the specific gas atomizing nozzle employed. The contact between the fluid and the gas may take place entirely outside the nozzle or within a chamber from which the spray exits through an orifice. The atomizing gas should contain at least 10% $CO_2$ by volume. In the preferred embodiment of the present invention, substantially pure carbon dioxide gas is used to accomplish the atomizing. When using substantially pure carbon dioxide gas as the atomizing gas, it has been determined that the amount of potassium carbonate in the resulting dry material is substantially reduced. When dissolving the $CO_2$ in the bicarbonate solution and when using an atomizing gas containing carbon dioxide, the aqueous solution of potassium bicarbonate is preferably at a low temperature so as to increase the amount of the carbon dioxide dissolved in the solution. In general, temperatures below 100° F. have produced good results.

The use of carbon dioxide as the atomizing gas and/or the dissolving of carbon dioxide in the potassium bicarbonate solution, and/or the use of carbon dioxide in the drying chamber has many advantages. One advantage, as hereinbefore set forth, is that the amount of potassium carbonate found in the spray dried product is substantially reduced. Another advantage is that a higher temperature may be used in the drying chamber which results in higher rates of evaporation and greater overall thermal efficiencies. In the absence of carbon dioxide in the drying chamber, the dry potassium bicarbonate is preferably maintained at a temperature below about 194° F., since at higher temperatures undesirable amounts of potassium carbonate are formed. With at least 2% carbon dioxide by volume in the drying chamber, the temperature of the dry potassium carbonate may be higher.

As long as the potassium bicarbonate particle contains moisture, the temperature of the particle is maintained below about 212° F. by the evaporation of water from the particle. When the particle is substantially dry, the temperature may, of course, exceed 212° F. when in contact with a gas above this temperature. In general, the temperature of the drying gas at the inlet to the drying chamber should not exceed about 1000° F. Also, when the potassium bicarbonate particles removed from the outlet of the spray drier are substantially dry, the temperature of the gas at the outlet should preferably not exceed about 275° F.

In order to give a fuller understanding of the invention, but with no intention to be limited thereto, the following specific example is given:

EXAMPLE

An aqueous solution of potassium bicarbonate was spray dried in a Turbulaire laboratory spray drier, type N-2, size 425E, manufactured by the Western Precipitation Corporation. The spray drier was equipped with a two-fluid, gas atomizing nozzle. A series of runs was conducted at various temperature conditions as set forth below in the table. Air was drawn through the drier at the rate of approximately 160 cubic feet per minute (S.T.P.). In runs 1 through 4, a 15% potassium bicarbonate solution was used, and in run 5, a 7.5% potassium bicarbonate solution was used. Other operating conditions are set forth in the table. In runs 1 and 5, air was used as the atomizing gas and in runs 2, 3 and 4, carbon dioxide was used as the atomizing gas. The rate of carbon dioxide passed through the atomizing nozzle was approximately 6.4 cubic feet per minute, thus giving approximately a 4% $CO_2$ atmosphere in the drying chamber. In run 1, no carbon dioxide was introduced into the spray drier and, accordingly, no substantial amount of carbon dioxide was present in the drying atmosphere. In run 5, carbon dioxide was introduced into the air inlet to the spray drier at the rate of approximately 6.4 cubic feet per minute so as to give a 4% carbon dioxide atmosphere in the drying chamber.

Table

| Run No. | Atomizing Gas | Inlet Temp., °F. | Outlet Temp., °F. | Drying Atmosphere | Rate of Adding $KHCO_3$ Solution, ml./min. | Wt. Percent $K_2CO_3$ In Dry Product |
|---|---|---|---|---|---|---|
| 1 | Air | 400 | 175–190 | Air | 65 | 14.16 |
| 2 | $CO_2$ | 500 | 195–205 | Air+4% $CO_2$ | 200 | 3.45 |
| 3 | $CO_2$ | 590 | 205–210 | Air+4% $CO_2$ | 100 | 5.81 |
| 4 | $CO_2$ | 600 | 240 | Air+4% $CO_2$ | 100 | 9.29 |
| 5 | Air | 600 | 230 | Air+4% $CO_2$ | 95 | 11.68 |

Comparing run 1 with the other runs, it may be noted that a large percent of potassium carbonate (14.16%) is produced when using air as the atomizing gas and air as the drying atmosphere.

Comparing run 5 with run 1, it may be noted that when carbon dioxide is present in the drying atmosphere, the percent of potassium carbonate formed is much lower even though the temperature in the drier was higher in run 5 than in run 1. Runs 2, 3 and 4 clearly show the benefits of using carbon dioxide as the atomizing gas. When using carbon dioxide as the atomizing gas, higher temperatures may be used in the drying chamber and the percent of potassium carbonate in the product is substantially reduced.

The description of the invention utilized specific reference to certain process details; however, it is to be understood that such details are illustrative only and not by way of limitation. Other modifications and equivalents of the invention will be apparent to those skilled in the art from the foregoing description.

Having now fully described and illustrated the invention, what is desired to be secured and claimed by Letters Patent is set forth in the appended claims.

I claim:

1. A method for spray drying potassium bicarbonate which comprises dissolving carbon dioxide in an aqueous solution of potassium bicarbonate and subsequently spraying the aqueous solution of potassium bicarbonate containing dissolved carbon dioxide into a substantially dry, gaseous atmosphere containing at least 2% carbon dioxide.

2. The method according to claim 1 wherein carbon dioxide is dissolved in said aqueous solution of potassium bicarbonate by impinging on said aqueous solution a stream of gas containing carbon dioxide.

3. The method according to claim 2 wherein said stream of gas is substantially pure carbon dioxide.

References Cited in the file of this patent

UNITED STATES PATENTS

| | | |
|---|---|---|
| 835,771 | Behrens | Nov. 13, 1906 |
| 999,972 | Ekenberg | Aug. 8, 1911 |
| 1,290,194 | Hiner | Jan. 7, 1919 |
| 1,303,682 | Kermer | May 13, 1919 |
| 1,308,403 | Doonar | July 1, 1919 |
| 2,055,084 | MacMullin | Sept. 22, 1936 |